United States Patent
Mamlet et al.

(10) Patent No.: US 11,678,295 B2
(45) Date of Patent: Jun. 13, 2023

(54) CONTACT TRACKING METHOD AND RELATED SERVER

(71) Applicant: Groundhog Inc., Taipei (TW)

(72) Inventors: Geoffrey Paul Bloch Mamlet, Taipei (TW); Ta-Gang Chiou, Taipei (TW); Tzu-Yi Lo, Taipei (TW)

(73) Assignee: Groundhog Inc., Taipei (TW)

( * ) Notice: Subject to any disclaimer, the term of this patent is extended or adjusted under 35 U.S.C. 154(b) by 171 days.

(21) Appl. No.: 17/229,881

(22) Filed: Apr. 14, 2021

(65) Prior Publication Data

US 2021/0329585 A1  Oct. 21, 2021

Related U.S. Application Data

(60) Provisional application No. 63/010,056, filed on Apr. 15, 2020.

(51) Int. Cl.
*H04W 64/00* (2009.01)
*H04B 17/318* (2015.01)
*H04B 17/27* (2015.01)

(52) U.S. Cl.
CPC .......... *H04W 64/006* (2013.01); *H04B 17/27* (2015.01); *H04B 17/318* (2015.01)

(58) Field of Classification Search
CPC ... H04W 64/006; H04B 17/27; H04B 17/318; H04B 17/26
USPC ......................................................... 455/456
See application file for complete search history.

(56) References Cited

U.S. PATENT DOCUMENTS

| | | | |
|---|---|---|---|
| 9,516,470 B1* | 12/2016 | Scofield | G01C 21/3697 |
| 2013/0335273 A1* | 12/2013 | Pakzad | H04W 4/023 |
| | | | 342/458 |
| 2018/0077538 A1* | 3/2018 | Matus | G08B 25/016 |
| 2021/0280321 A1* | 9/2021 | Weir | G06F 16/2379 |

\* cited by examiner

*Primary Examiner* — Don N Vo
(74) *Attorney, Agent, or Firm* — JCIPRNET

(57) ABSTRACT

A contact tracking method and a related server are provided. In the method, the positioning information of multiple user equipments (UEs) is obtained. The UEs transmit wireless signals. The positioning information is determined based on the wireless signal. The wireless signal indicates a network provider identifier, a signal strength, or geolocation. The travel routes of the UEs are determined. Each travel route records the positioning information of one UE over time. The travel routes are analyzed to determine a contact situation between a first UE and a second UE of the UEs based on a contact criteria.

18 Claims, 2 Drawing Sheets

CONTACT TRACKING METHOD AND RELATED SERVER

CROSS-REFERENCE TO RELATED APPLICATION

This application claims the priority benefit of U.S. Provisional Application No. 63/010,056, filed on Apr. 15, 2020. The entirety of the above-mentioned patent application is hereby incorporated by reference herein and made a part of this specification.

BACKGROUND OF THE DISCLOSURE

1. Field of the Disclosure

The present disclosure generally relates to a location tracking mechanism, in particular, to a contact tracking method and a related server.

2. Description of Related Art

The outbreaking of COVID-19 in 2020 has raised a global threat as it is strongly infectious just through the air, and the virus survives in various surfaces for a long time, up to 7 days. People are exposed to the threat by just standing nearby a patient without protection, or by touching anything that was exposed, such as money, elevator buttons, and handrails in public. Hence the public places turn out to be a great transmission pool, and the risk is proportional to the density of population.

Furthermore, up to 30% of COVID-19 infected persons are having mild or no symptoms. It can take a few weeks to a couple of months until asymptomatic infected persons are no longer contagious. Asymptomatic carriers could contribute significantly to causing secondary waves of contagion. Currently, there is no efficient way to identify asymptomatic carriers except for large-scale testing.

It is desirable to incorporate location tracking of patients' travel history, so as to track people who were in contact with them and help identify potential asymptomatic carriers, who could have infected multiple persons without knowing.

SUMMARY OF THE DISCLOSURE

Accordingly, the present disclosure is directed to a contact tracking method and a related server, to estimate potential asymptomatic carriers.

In one of the exemplary embodiments, a contact tracking method, includes, but is not limited thereto, the following steps. The positioning information of multiple user equipments (UEs) is obtained. The UEs transmit wireless signals. The positioning information is determined based on the wireless signal. The wireless signal indicates a network provider identifier, a signal strength, or geolocation. The travel routes of the UEs are recorded. Each travel route records the positioning information of one UE over time. The travel routes are analyzed to determine a contact situation between a first UE and a second UE of the UEs based on contact criteria.

In one of the exemplary embodiments, a server, includes, but is not limited thereto, a memory and a processor. The memory is used for storing program code. The processor is coupled to the memory. The processor is configured for loading and executing the program code to perform the following steps. The positioning information of multiple UEs is obtained. The UEs transmit wireless signals. The positioning information is determined based on the wireless signal. The wireless signal indicates a network provider identifier, a signal strength, or geolocation. The travel routes of the UEs are determined. Each travel route records the positioning information of one UE over time. The travel routes are analyzed to determine a contact situation between a first UE and a second UE of the UEs based on contact criteria.

In light of the foregoing, according to the contact tracking method and the related server, a person who has been in contact with another person may be determined based on wireless signals. Therefore, the potential asymptomatic carrier would be found out by comparing its travel route with the infectious disease patient. Furthermore, almost everyone has a cell phone, in conjunction with location tracking based on wireless signals, the locations of multiple persons who carry cell phones can be tracked.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
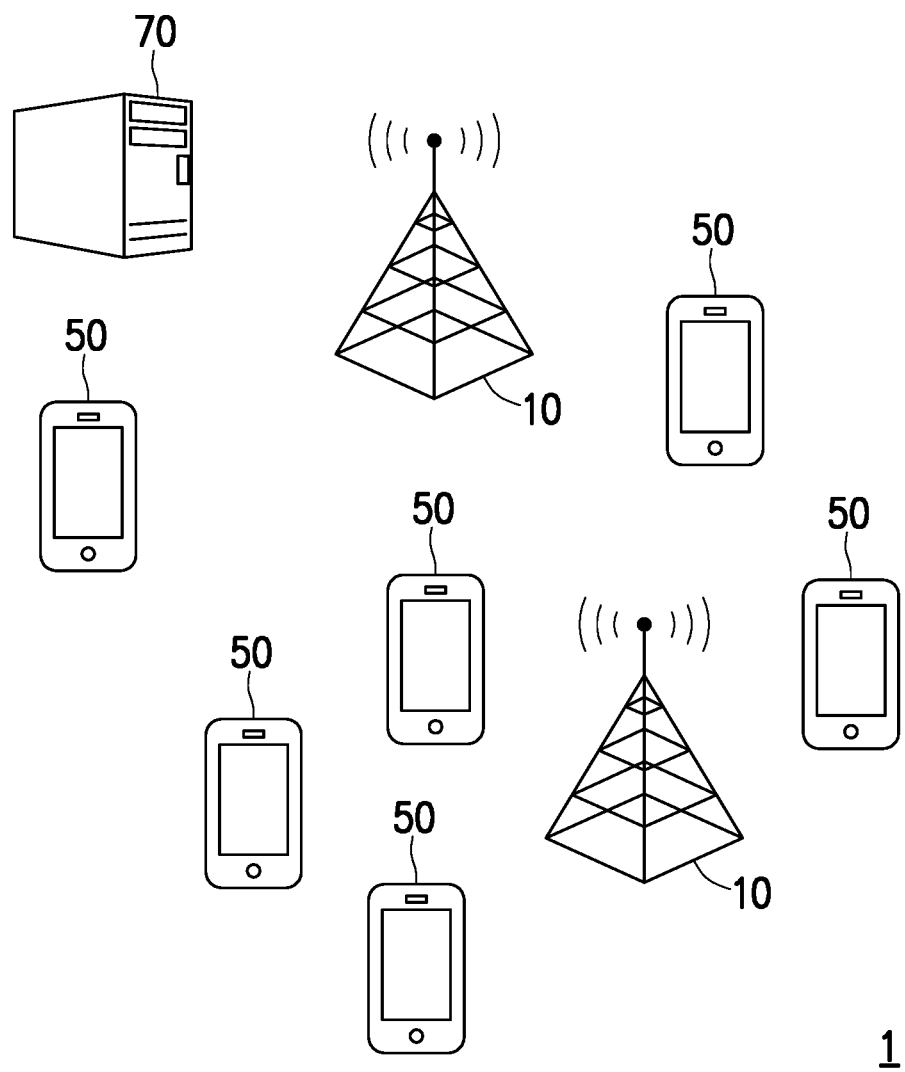
FIG. 1 is a block diagram illustrating a system according to one of the exemplary embodiments of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram illustrating a system 1 according to one of the exemplary embodiments of the disclosure. Referring to FIG. 1, the system 1 may include, but is not limited thereto, one or more base station 10, one or more user equipments (UEs) 50, and a sever 70. It should be noticed that the numbers of the cellular base station 10 and the UEs 50 may be determined based on the actual situation.

The base station 10 may have various implementations, for example (but not limited to), a home evolved Node B (HeNB), an eNB, a next generation Node B (gNB), an integrated access and backhaul (IAB) network node, an advanced base station (ABS), a base transceiver system (BTS), a relay, a repeater, an access point, a wireless router, a Bluetooth transceiver, a cell and/or a satellite-based communication base station.

The UE 50 may have various implementations, for example (but not limited to), a mobile station, an advanced mobile station (AMS), a telephone apparatus, customer premise equipment (CPE), a wireless sensor, a handheld device with a wireless communication function, a computing device or other processing devices connected to wireless modems, an in-vehicle device, a wearable device, or the like.

It should be noticed that the base station 10 and the UE 50 may belong to a mobile network with centralized network architecture, a network with distributed network architecture, or even ad-hoc network architecture.

The server 70 may be a desktop computer, a laptop, a smartphone, a tablet, a network host, or any computing device. In some embodiments, the server 70 may be a cellular core network entity such as a mobility management entity (MME) or an access and mobility management function (AMF).

Figure 2:
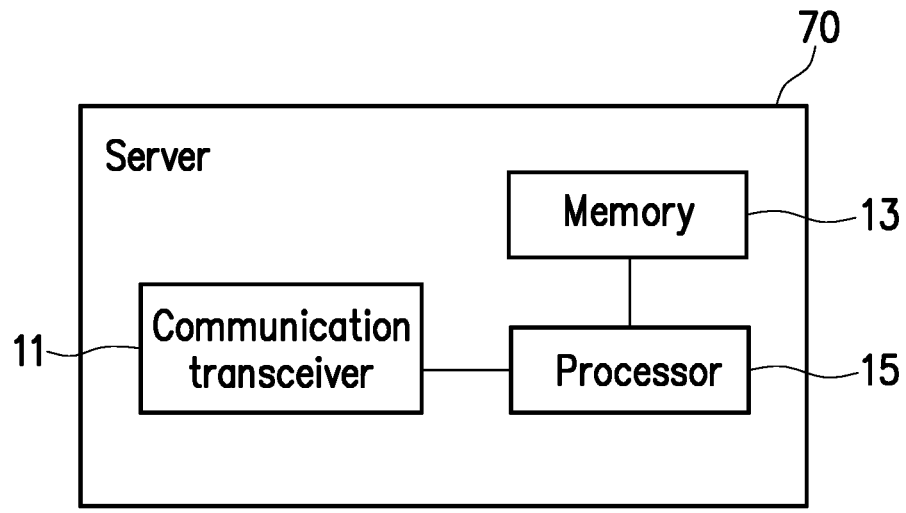
FIG. 2 is a block diagram illustrating a server according to one of the exemplary embodiments of the disclosure.

FIG. 2 is a block diagram illustrating the server 70 according to one of the exemplary embodiments of the disclosure. Referring to FIG. 2, the server 70 may include, but is not limited to, a communication transceiver 11, a memory 13, and a processor 15.

The communication transceiver 11 could be a communication interface (such as universal serial bus (USB), universal asynchronous receiver/transmitter (UART), RJ45, etc.) or a wireless transceiver (such as UMTS, LTE, 5G New Radio, Wi-Fi, Bluetooth, etc.). The communication transceiver 11 is used to transmit/receive signals to/from the base station 10, the UE 50, or a cellular core network entity.

The memory 13 could be any type of a fixed or movable random access memory (RAM), a read-only memory (ROM), a flash memory, a similar device, or a combination of the above devices. The memory 13 records program codes, network configurations, contact list, risk value, positioning information, buffer data, or permanent data, which would be introduced later.

The processor 15 is coupled to the communication transceiver 11 and the memory 13. The processor 15 is configured to process digital signals, executes a procedure of the exemplary embodiment of the disclosure, and is adapted to access or load the data, program codes, and software modules stored by the memory 13. Functions of the processor 15 may be implemented by using a programmable unit such as a central processing unit (CPU), a microprocessor, a microcontroller, a digital signal processing (DSP) chip, a field-programmable gate array (FPGA), etc. The functions of the processor 15 may also be implemented by an independent electronic device or an integrated circuit (IC), and operations of the processor 15 may also be implemented by software.

In the following, the method in the embodiment of the disclosure would be described in combination with apparatuses and elements thereof in the system 1. Each process of the method according to the embodiment of the disclosure may be adjusted according to an implementation situation and is not limited thereto.

Figure 3:
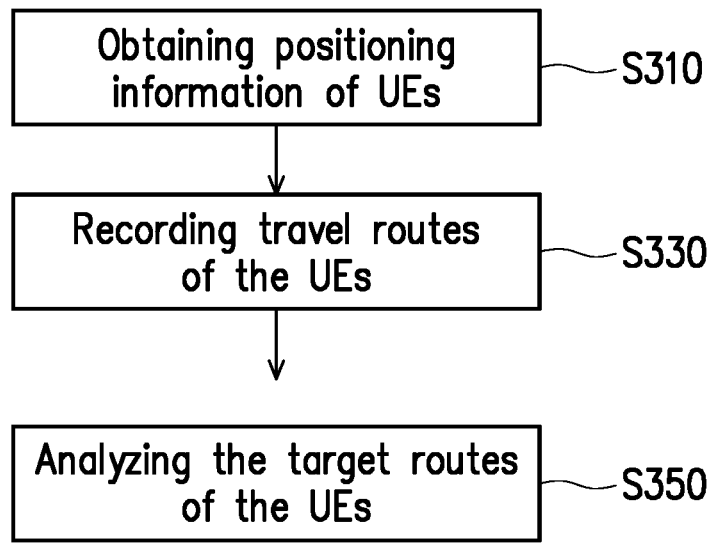
FIG. 3 is a flowchart illustrating a contact tracking method according to one of the exemplary embodiments of the disclosure.

FIG. 3 is a flowchart illustrating a contact tracking method according to one of the exemplary embodiments of the disclosure. Referring to FIG. 3, the processor 15 of the server 70 may obtain positioning information of the UEs 50 (step S310). Specifically, each UE 50 may transmit wireless signals through a cellular network, Bluetooth, Wi-Fi, or other wireless communication technologies. The positioning information is determined based on the wireless signals. The positioning information could be latitude and longitude, direction, tilt, or a specification environment.

The mobile network has been evolved for many years. The mobile network essentially comprises several components such as user equipment (UE), eNodeB (eNB), and evolved packet core (EPC). The mainstream standard defined by 3GPP (3rd Generation Partnership Project) is known as long term evolution (LTE) as well as 5G.

One of the major features in the mobile network is mobility management, used originally for maintaining communication but could also be used for location tracking. In conventional approaches, thousands of base stations 10 are geographically distributed around the cities and urbans to jointly provide the network accessibility for UEs 50. Therefore, it is technically convenient for the mobile network to calculate the locations of each UE 50.

In one embodiment, the wireless signals indicate a network provider identifier. The network provider identifier could be the cell ID, Bluetooth address, an access point name of the accessed base station 10 which communicated with the UE 50 through the wireless signals. In some examples, the network provider identifier could be any identification of the base station 10. Each network provider identifier has its corresponding positioning information.

In one embodiment, the wireless signal indicates its signal strength. There are several positioning algorithms including triangulation, trilateration, and TDOA (Time Difference Of Arrival), which can be applied to geo-locate the monitoring results (corresponding to the location of UE 50). The monitoring result is related to signal transmission conditions (such as signal strength, channel quality, encoding manner, etc.) of the UE 50 in one or more mobile networks. For example, the monitoring results could be RSRP, RSRQ, etc. The signal strength of the monitoring result may be used for triangulation, trilateration, multilateralization, or other positioning algorithms.

In one embodiment, the wireless signal indicates the geolocation of the UE 50. The minimization of drive test (MDT), which is a network performance measurement, is introduced in one release of the third-generation partnership project (3GPP). In the mechanism of the MDT, an mobile network provider may be able to configure the measurement report process of the UE 50 through network configuration, and the UE 50 will send measurement reports accordingly with satellite positioning information such as latitude and longitude coordinates (i.e., the geolocation of the UE 50). The satellite positioning could be based on the global positioning system (GPS), Galileo satellite system, global navigation satellite system (GLONASS), BeiDou Navigation Satellite System, or other global navigation satellite system (GNSS). In some embodiments, the UE 50 may use indoor location technology in conjunction with Wi-Fi or Bluetooth to determine the geolocation of the UE 50.

In some embodiments, the UE 50 may use proximity detection manners, such as those using Bluetooth chip information, which could also utilize to determine whether the UE 50 is located within a certain distance relative to another UE 50.

The processor 15 of the server 70 may record the travel routes of the UEs 50 (step S330). Specifically, the travel routes include a target route of UE 50 (called the first UE hereinafter) and one or more non-target routes of other UEs 50 (called the second UEs hereinafter). In one embodiment, the first UE corresponds to an infectious disease patient, and the second UE corresponds to a person who is not identified as the infectious disease patient. In other words, the target route corresponds to an ower of the UE 50 who is diagnosed as an infectious disease patient. The non-target route corresponds to an ower of the UE 50 who has not yet been diagnosed as an infectious disease patient. However, in other embodiments, the first UE corresponds to another label different from the infectious disease patient, and the second UE corresponds to other labels different from the first UE.

Each travel route records the positioning information of one UE 50 over time. In one embodiment, the positioning information includes locations and their timestamps. The processor 15, the base station 10, or the UE 50 may provide a corresponding timestamp to the location of one UE 50. The timestamp indicates the time when a corresponding location of the UE 50 is recorded or determined. Therefore, a travel route may record a list of the locations and the corresponding timestamps.

The processor 15 of the sever 70 may analyze the travel routes of the UEs 50 to determine a contact situation between the first UE and the second UE of the UEs based on contact criteria (step S350). Specifically, the contact list indicates the persons are in contact with the first UE. In one embodiment, the processor 15 may determine a location range and a time-shift range for the location and the corresponding timestamp recorded in the target route. The location range could be, for example, 30, 50, or 100 meters. The time-shift range could be, for example, 30, 60, 180 minutes.

In one embodiment, the processor 15 may determine the contact criteria. For example, the contact criteria is deeming the second UE as contacted to the first UE in response to a distance between the first UE and the second UE being less than a distance threshold for more than a time threshold. For another example, the contact criteria is deeming the second UE as contacted to the first UE in response to the second UE having visited a spot (such as a restaurant, a mall, or a movie theater) where the first UE has stayed beforehand.

The processor 15 may select a potentially-contacted target from the UEs 50 by comparing the location range and the time-shift range with locations and corresponding timestamps recorded in the travel routes of the second UEs. In one embodiment, a contact criteria is defined as a distance threshold surrounding the travel route (i.e., the target route) of the first UE per timestamp. Based on the contact criteria, the database, which records the travel routes, is searched to obtain a list of UEs 50 that could potentially have been in contact with the first UE. For example, people located around the patient's location within 50 meters at subsequentially the same timestamps may be deemed as potentially have been in contact with the patient, and its UE 50 would be identified as the potentially-contacted target.

In one embodiment, a contact criteria is defined as a spot where the first UE has stayed. Based on the contact criteria, the database is searched to obtain a list of UEs 50 that are potentially exposed to the first UE. The user having the first UE has visited a church this morning, another user having the second UE who visited the church this afternoon may be deemed as contacted to the first UE.

In one embodiment, a contact criteria is defined as a time shift surrounding the patient's timestamp along the travel route. Based on the contact criteria, the database is searched to obtain a list of UEs 50 that are potentially exposed to the first UE. For example, people crossing the same location of the patient within 60 minutes may be determined as potentially at risk, and its UE 50 would be identified as the potentially-contacted target.

Then, the processor 15 may record the potentially-contacted target in the contact list. In the database, if two UEs 50 are searched in a certain location range and time range, they are determined as potentially contacted. The contact list can be generated from the database based on the contact criteria as described in the aforementioned embodiments.

Generally, the infectious risk is substantially reverse to the ranges of location and time. Different methods can be utilized to narrow down or expand the contact list. In one embodiment, the processor 15 may determine the mobility of the first UE. The mobility could be moving state, stationary state, or other behaviors. The processor 15 may select one or more first routes from the travel routes of the second UE. The first route is corresponding to one UE 50 having the same mobility, and merely the first route is used to compare with the travel route of the first UE. For example, depending on the information available in the database, one way to narrow down the contact list is to compare moving persons to moving persons only, compare stationary persons to stationary persons only; or not comparing people who are moving on the road to people staying at home or office.

In one embodiment, the processor 15 may determine the environment where the first UE is located. The environment could be related to indoor/outdoor, hotspot, or the population density of the location. For example, to narrow down the contact list is to merely compare indoor persons to indoor persons only, and/or merely compare outdoor persons to outdoor persons only.

In one embodiment, when there are multiple first UEs, their travel routes (i.e., the target route) and contact lists can be cross-checked. If the two first UEs are identified as contacted based on the contact criteria, one of them is likely to be the source whereas the other is likely to be the target.

In one embodiment, the processor 15 may compare one non-target route corresponding to the second UE with other non-target routes of the second UEs, to generate a second contact list, wherein the second contact list indicates the persons have contact with the potentially-contacted target. If one person has a direct contract history with the first UE, he/she is a first-level contact. Other people who contacted the first level contact, are referred to as $2^{nd}$ level contacts and would be recorded in the second contact list. Furthermore, the proposed travel route analysis can be recursively executed on multi-level contacts to determine the potential risks of persons having the second UE.

In one embodiment, the processor 15 may provide a risk value for one UE 50 recorded in the contact list or the second contact list. The risk value is related to a duplication of the travel routes. Specifically, most of the first UE can be traced back to the contact source, but still many of them cannot find where the contact source comes from. For example, it is medically proven that some virus carriers hidden in the crowd are asymptomatic. By cross-checking the contact list of different first UEs, a further embodiment introduces the possibility to identify asymptomatic carriers. Persons who appear on more contact lists have a higher risk of being contacted. For example, they could also potentially be asymptomatic carriers, especially if the contact lists of the first UEs do not include any known second UE besides himself or herself. The more contact lists a person appears on (i.e., the higher duplication), the higher likelihood he or she could be a potential contacted person. A risk value can be defined per person to indicate the risk level. People with higher risk value have a higher chance to be contacted. For example, these people could be medical or health care professionals who are required to meet the patients or could be asymptomatic carriers. It is advisable to prioritize people with higher risk value for testing the disease or do quarantine depending on the situation.

In one embodiment, the more contact lists a person appears on (i.e., the higher duplication), the higher risk value he or she has.

In one embodiment, the risk value is further related to direct contact with the first UE. People who contacted lower-level contacts (i.e., direct contact) are labeled with a higher risk value than those who contacted higher-level contacts (i.e., indirect contact). By actively digging into the database and recursively labeling the contact lists with risk value based on the known patients who do not know the infection source, it is possible to discover common contact who possesses a high risk value. This could efficiently reduce the opportunity of further outbreaking infections.

In one embodiment, the risk value is further related to the environment where the first UE is located. The infectious risk is substantially reverse to the ranges of location and time. The type of the geographic location (positioning information) can be categorized, for example, into indoors and outdoors. The indoor environment should score higher risk values than the outdoor environment. In another example, the population density information can be obtained from the telecommunication network as a real-time risk indicator. Places with crowded people are weighted with higher risk values.

In some embodiments, it is also possible to further investigate the geographical distance between persons with other methods, such as comparing the Bluetooth chip recorded on each cell phone in order to confirm if they came in proximity with each other, between persons who have Bluetooth turned on and the proper app installed on their applicable cell phones.

In one embodiment, the risk values of locations are dynamically maintained. If one particular location with a predetermined distance range is deemed as a hotspot (i.e., the belonging environment is the hotspot) where one first UE contacts the other patient, the risk value of the hotspot is increased. The more people are contacted at the hotspot, the more risk value it weighs. Consequently, other people who have a travel route passing through the hotspot are weighted accordingly, based on how long and/or how close they stay. In some embodiments, a location-based cross-search can be conducted at the hotspots, by employing a wide time-shift range and distance range to derive a contact list of potential infectious sources and/or victims. The range parameters for searching can be proportional to the risk value of the hotspots.

In one embodiment, the processor 15 may determine the environment based on a check-in place posted by the first UE 50. With the assumption that the investigation will be performed conforming to privacy laws, the database can combine with existing social network information to increase the accuracy of risk determination. For example, it is possible to infer if a user was mostly indoor or outdoor at a place based on social network check-in information.

In one embodiment, the second UE may be monitored by the authority or be warned when getting close to a suspect or stepping into a risk spot where the first UE has visited.

In summary, in the contact tracking method and the related server, a network provider identifier, a signal strength, or the geolocation indicated by wireless signal would be used to determine the positioning information of the UE and further establish the travel route of the UE over time. The target route corresponding to the first UE is compared with the travel route of the second UE, to determine the potentially-contacted target and record the potentially-contacted target in the contact list. Furthermore, mobility, environment, and risk value are used to enhance the contact list. Therefore, it is easy and convenient to track people who were in contact with the infectious disease patient and help identify potential asymptomatic carriers, who could have infected multiple persons without knowing.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A contact tracking method, comprising:
obtaining positioning information of a plurality of user equipments (UEs), wherein the plurality of UEs transmit wireless signals, the positioning information is determined based on the wireless signals, and the wireless signals indicate one of a network provider identifier, a signal strength, and geolocation;
recording travel routes of the UEs, wherein each of the travel routes records the positioning information of one of the UEs over time; and
analyzing the travel routes of the UEs to determine a contact situation between a plurality of first UEs and a second UE of the UEs based on a contact criteria, comprising:
providing the travel routes of the first UEs, to generate contact lists of the first UEs;
providing a risk value for one of the UEs, wherein the risk value is related to a duplication of the travel routes, and
in response to the second UE appearing on more contact lists of the first UEs with a higher duplication, the second UE has a higher risk value.

2. The contact tracking method according to claim 1, wherein the positioning information comprises a location and a timestamp, and the step of recording travel routes of the UEs comprises:
providing a corresponding timestamp to the location of one of the UEs, wherein one of the travel routes records the location and the corresponding timestamp.

3. The contact tracking method according to claim 2, wherein the step of analyzing the travel routes of the UEs comprises:
determining the contact criteria, wherein the contact criteria comprises:
deeming the second UE as contacted to the first UE in response to a distance between the first UE and the second UE being less than a distance threshold for more than a time threshold; and
deeming the second UE as contacted to the first UE in response to the second UE having visited a spot where the first UE has stayed beforehand.

4. The contact tracking method according to claim 1, wherein the step of analyzing the travel routes of the UEs comprises:
determining a mobility of the first UE; and
comparing the travel route of the second UE having the same mobility.

5. The contact tracking method according to claim 1, wherein the step of analyzing the travel routes of the UEs comprises:
determining an environment where the first UE is located; and
comparing the travel route of the second UE located in the same environment.

6. The contact tracking method according to claim 1, wherein the step of analyzing the travel route of the UEs comprises:
providing a spot and analyze all of the UEs having visited the spot to generate a contact chain.

7. The contact tracking method according to claim 1, wherein the risk value is further related to direct contact with the first UE.

8. The contact tracking method according to claim 1, wherein the risk value is further related to an environment where the first UE.

9. The contact tracking method according to claim 8, further comprising:
determining the environment based on a check-in place posted by the first UE.

10. A server, comprising:
a memory, storing program code; and
a processor, coupled to the memory, configured to load and execute the program code to perform:
obtaining positioning information of a plurality of user equipments (UEs), wherein the plurality of UEs transmit wireless signals, the positioning information is determined based on the wireless signals, and the wireless signals indicate one of a network provider identifier, a signal strength, and geolocation;
recording travel routes of the UEs, wherein each of the travel routes records the positioning information of one of the UEs over time; and
analyzing the travel routes of the UEs to determine a contact situation between a plurality of first UEs and a second UE of the UEs based on a contact criteria, comprising:
providing the travel routes of the first UEs, to generate contact lists of the first UEs;
providing a risk value for one of the UEs, wherein the risk value is related to a duplication of the travel routes, and
in response to the second UE appearing on more contact lists of the first UEs with a higher duplication, the second UE has a higher risk value.

11. The server according to claim 10, wherein the positioning information comprises a location and a timestamp, and the processor is further configured to perform:
providing a corresponding timestamp to the location of one of the UEs, wherein one of the travel routes records the location and the corresponding timestamp.

12. The server according to claim 11, wherein the processor is further configured to perform:
determining the contact criteria, wherein the contact criteria comprises:
deeming the second UE as contacted to the first UE in response to a distance between the first UE and the second UE being less than a distance threshold for more than a time threshold; and
deeming the second UE as contacted to the first UE in response to the second UE having visited a spot where the first UE has stayed beforehand.

13. The server according to claim 10, wherein the processor is further configured to perform:
determining a mobility of the first UE corresponding to the infectious disease patient; and
comparing the travel route of the second UE having the same mobility.

14. The server according to claim 10, wherein the processor is further configured to perform:
determining an environment where the first UE c; and
comparing the travel route of the second UE located in the same environment.

15. The server according to claim 10, wherein the processor is further configured for:
providing a spot and analyze all of the UEs having visited the spot to generate a contact chain.

16. The server according to claim 10, wherein the risk value is further related to direct contact with the first UE.

17. The server according to claim 10, wherein the risk value is further related to an environment where the first UE is located.

18. The server according to claim 17, wherein the processor is further configured to perform:
determining the environment based on a check-in place posted by the first UE.

* * * * *